US011165386B2

(12) United States Patent
Casla Urteaga

(10) Patent No.: US 11,165,386 B2
(45) Date of Patent: Nov. 2, 2021

(54) PORTABLE SYSTEM OF PHOTOVOLTAIC PANELS WITH BIAXIAL SOLAR TRACKING STRUCTURE

(71) Applicant: XIZAN ENERGY EFFICIENCY S.L., Madrid (ES)

(72) Inventor: Luis Casla Urteaga, Madrid (ES)

(73) Assignee: XTZAN ENERGY EFFICIENCY S.L., Madrid (ES)

( * ) Notice: Subject to any disclaimer, the term of this patent is extended or adjusted under 35 U.S.C. 154(b) by 0 days.

(21) Appl. No.: 16/968,776

(22) PCT Filed: Feb. 15, 2019

(86) PCT No.: PCT/ES2019/070085
§ 371 (c)(1),
(2) Date: Aug. 10, 2020

(87) PCT Pub. No.: WO2019/158796
PCT Pub. Date: Aug. 22, 2019

(65) Prior Publication Data
US 2020/0403560 A1     Dec. 24, 2020

(30) Foreign Application Priority Data
Feb. 16, 2018   (ES) ............................... ES201830143

(51) Int. Cl.
*H02S 20/32*     (2014.01)
*H02S 10/40*     (2014.01)

(52) U.S. Cl.
CPC ............. *H02S 20/32* (2014.12); *H02S 10/40* (2014.12)

(58) Field of Classification Search
CPC .......... H02S 20/32; H02S 10/40; H02S 30/20; Y02E 10/50
See application file for complete search history.

(56) References Cited

U.S. PATENT DOCUMENTS

| 6,123,067 A | 9/2000 | Warrick |
| 8,046,961 B1 | 11/2011 | Cutting et al. |

(Continued)

FOREIGN PATENT DOCUMENTS

| DE | 202011050132 U1 | 9/2011 |
| DE | 102010037776 A1 | 3/2012 |

(Continued)

*Primary Examiner* — Matthew T Martin
(74) *Attorney, Agent, or Firm* — Hayes Soloway PC

(57) ABSTRACT

The present invention comprises a solar tracking portable structure with 2 axes orientation motors (elevation an azimuth) that integrates light semi-flexible solar panels technology with a particular design whose goal is to achieve the maximum lightness and manageability of the system. The system as a whole is portable and foldable, and the orientation of the motors is controlled by an electronic system. The tracking structure comprises three coupled substructures: a bottom substructure (1) permanently in contact with ground; a mid substructure (2) that rotates with respect to the bottom structure (1) in the horizontal plane (azimuth); and a top structure (3) that rotates with respect to the mid structure (2) in the vertical plane (elevation). The folding of the pieces that comprises the system is organised in 4 layers each of them occupying an area of the same size.

14 Claims, 9 Drawing Sheets

(56) References Cited

U.S. PATENT DOCUMENTS

| | | |
|---|---|---|
| 2003/0172922 A1 | 9/2003 | Haber |
| 2008/0163921 A1 | 7/2008 | Leong et al. |
| 2010/0043866 A1 | 2/2010 | Magan De La Rocha |
| 2012/0085387 A1* | 4/2012 | French, Sr. ............. H02S 30/20 |
| | | 136/245 |
| 2014/0238467 A1 | 8/2014 | Martin et al. |
| 2016/0020727 A1* | 1/2016 | Cheung ................... H02S 20/30 |
| | | 136/245 |
| 2016/0261226 A1* | 9/2016 | Hamilton ................ H02S 20/32 |

FOREIGN PATENT DOCUMENTS

| | | |
|---|---|---|
| ES | 2345078 A1 | 9/2010 |
| ES | 2368402 A1 | 11/2011 |
| WO | 2008155652 A2 | 12/2008 |
| WO | 2012013827 A1 | 2/2012 |
| WO | 2013115832 A2 | 8/2013 |
| WO | 2019158796 A1 | 8/2019 |

* cited by examiner

PORTABLE SYSTEM OF PHOTOVOLTAIC PANELS WITH BIAXIAL SOLAR TRACKING STRUCTURE

CROSS-REFERENCE TO RELATED APPLICATIONS AND PRIORITY

This patent application claims priority from PCT Patent Application No. PCT/ES2019/070085 filed Feb. 15, 2019, which claims priority from Spanish Patent Application No. ES P201830143 filed Feb. 16, 2018. Each of these patent applications are herein incorporated by reference in its/their entirety.

TECHNICAL FIELD

The present invention belongs to the renewable energy field and more specifically to that of the photovoltaic generation installations comprising the panels with the photovoltaic cells and the supporting and solar tracking structures.

The object of the present invention is a system that comprises a solar tracking portable structure with 2 axes orientation motors (elevation an azimuth) that integrates light solar panels of semi-flexible technology with a particular design whose goal is to achieve maximum lightness and manageability. The system as a whole is portable and foldable, and the orientation of the motors is controlled by an electronic system.

BACKGROUND

There are numerous solar tracking systems for photovoltaic and thermal panels publicly disclosed that enable their orientation to be kept in the most perpendicular position to the sun radiation to maximise energy generation. All these tracking structures have had to solve the numerous technical challenges (structural, mechanical and electronic) required for positioning the supported panels that are significatively heavy and large-area elements. For this reason tracking structures have been in general of great technical complexity and entailing relatively high costs, which have been tried to make up for increasing the size of the installation, with the logical goal that each single structure could integrate as much panels as possible. The downside is that these solutions are almost exclusively fixed and very heavy installations, often requiring ground conditioning, foundations and almost always assembly, maintenance and operation works executed by specialized personnel.

This makes these solutions viable only, perhaps, in large generation plants.

As background of this type of structures the Spanish patent ES2345078 may be cited, which presents a large swivelling frame for the fixing of several panel rows and is supported by a large thick column and a foundation both designed with metal profiles.

Another example, in line with the mentioned complex mechanism and large proportions, is the solution presented in the U.S. Pat. No. 6,123,067 which comprises a frame that turns around a pedestal driven by 2 hydraulic cylinders.

It's also worth mentioning several references which have explored the spatial extension previously mentioned. The US patent US2010043866 presents a large turning platform in the azimuth plane consisting in a circular guide base with a central foundation upon which a lattice of metal sections rests through motorised wheels that give support to the poles which support 2 rows of panels.

The Spanish patent ES2368402 proposes a modular single-axis solution consisting of a horizontal structure made up of transversal profiles and axes over which pivot the respective arrays of panels. The axes of the arrays are attached by means of draw bars that transmit the pivoting motion from one single actuator that is expected to be placed in a post foundation to support the high resulting tension.

There are very few records of more simple structures allowing some easiness in terms of assemblage, handling and transport.

The US patent US2003172922A1 proposes a modular solution easier to adapt to mobility requirements consisting in a ridge-shaped rotating bar with 2 support points separating 3 spaces for the panels, but it does not result in a volume compact enough to be transportable.

The patent application WO 2012/013827 A1 goes beyond in the search of compact and easy to transport and to install solutions by means of a structure design in 2 foldable parts, one to support the panel and the other as a floor support that is fixed to it by nails or wheels. The solution comprises nevertheless a large number of swivel arms that even though being proposed in light metallic materials, aluminium for example, increases its weight significantly making it inconvenient to transport.

The present invention solves the mentioned issues by means of a portable design, even in operation, easy to disassemble and fold in a compact volume for storage and transport.

DESCRIPTION OF THE INVENTION

The present invention comprises a solar tracking portable structure with 2-axes orientation motors (elevation and azimuth) that integrates light solar panels using semi-flexible technology with a specific design for the system consisting in 4 subpanels slightly separated in their junction and comprising a pyramidal shape in order to gain the maximum lightness and manageability. The system as a whole is portable and foldable and the orientation of the motors is controlled by an electronic system.

The tracking structure that supports and drives the panels comprises three substructures (a bottom substructure, a mid substructure and a top substructure) that are coupled by joints and comprising in turn a plurality of elements with different functions.

The base tripod-shaped bottom substructure (1) is permanently in contact with ground by means of supports at their ends and remains fixed during the solar tracking process.

The mid substructure (2) rests horizontally on the bottom structure (1) and rotates with respect to it on the horizontal plane (solar azimuth) by means of a joint with vertical rotation axis.

The top structure (3) where the panel is assembled rests vertically on the mid substructure (2) and rotates with respect to it on the vertical plane (solar elevation) by means of a joint with horizontal rotation axis.

The tracking structure can be disassembled in a quick and easy way using a small number of tools and the resulting pieces are folded in a compact volume for its storage and transport. Furthermore, its design is envisaged in plastic for its lightness, but also in order to be manufactured wherever a 3D printer is available.

The movement of the system around the 2 solar orientation axes (elevation and azimuth) is accomplished by means of 2 sets of cylindrical gears of parallel axes, a set for azimuth and a set for elevation, with internal cylindrical wheels and large transmission rate. The size and specific design of gears' teeth produces very small friction and this aspect together with the high transmission rate allows the movement of the gears with low power cheap motors. Each set of gears comprise a large gear (one for the azimuth and another for the elevation) and a small one (one for the azimuth and another for the elevation).

The tracking structure supports itself by means of an anti-overturn system consisting in a tripod-shaped base in the bottom substructure (1) that concentrates most of structures' mass (turning down its center of gravity) and end supports that are greatly separated to maximise torque absorptions capacity. The end support of the legs are manually removable in an easy way allowing the attachment of supports with different designs, and the joint with the leg is designed to auto fit by means of a double tilted rod (1.13) that transforms the existing shear stress in the joint into a compressive stress between the 2 faces of the joint stabilizing the support.

The internal transmission of torques from the panel to the tripod through the substructures is achieved by one single structural principle consisting in taking advantage of the presence of the large cylindrical gear on each joint and supporting in each joint the peripheral ends of the large cylindrical gear on bearings placed on the substructure to which the torque is transmitted.

To this end, the azimuth large gear, placed in the base of the mid substructure (2), is fixed in its center by the bottom joint axis and rests, by its top and bottom sides, on bearings contained respectively in the legs below and in an above restraint ring rigidly connected to the legs of the bottom substructure (1). On the other hand, the elevation large gear, placed in the top substructure (3), is contained in a lattice consisting of two parallel wheels with transverse connections that is connected to the top end of the pole of the mid substructure (2) by means of the horizontal axis of the elevation joint, and that leans the peripheral ends of said wheels by their internal sides on the bearings contained in said pole.

The position of the gears is controlled by means of standard motors that are controlled by SW from an electronic board placed in the base of the structure.

The solar panel (4) makes use of semi-flexible technology to favour the lightness and manageability of the system, and it is assembled by means of screws to the structure through the frame of the top substructure (3). The design of the panel is pyramidal to favour the stability of the system as a whole, and it is divided in 4 detachable subpanels.

The design used for the cells of the panels is a standard type based on squares with cut-off corners that allow the opening of hollows between internal cells of the panels for the fixation screws with the frame. The end of each panel in the central junction of the 4 subpanels has a cut-off edge that opens a space for the grip of the retractable handle whose rods are collected inside the structure behind the panel.

In addition to this top handle that allows the handling of the system from the top, the structure has a curved bottom handle joined to the pole of the mid substructure (2) that allows the handling of the system from the bottom. Both handles are close to the center of gravity of the assembled system allowing its transport keeping its verticality and avoiding tensions in the joints.

The detachable elements and cabling tracts resulting from the dissemblance of the complete system are designed to be packed and folded in a compact set of minimum volume to fit in a packing box for its transport and storage. The folding is organised in 4 layers of elements each of them occupying an area of the same size with the following layout applicable to all embodiments:

the first layer contains the upper subpanels joined by their frontal sides, the second contains the lower subpanels joined also their frontal sides, the third contains the entire fixation frame of the top substructure (3), and the forth contains in the center the bottom substructure (1) together with the azimuth large gear of the mid substructure (2), on one side the lattice of the elevation gear in folded shape of the top substructure (3) and on the other the pole with the handle folded of the mid substructure (2).

The main advantages of this invention, with respect to the mentioned background, are the following:

Firstly, the tracking structure is self-supporting. This means that, as opposed to current installations, that are in most cases fixed and require some kind of foundation, this system is based on a very light plastic structure that, due to an anti-overturn design, can work with no fixation to ground in conditions with low exposition to the wind. The end supports of the legs are manually removable and therefore different designs with different ground fixation degrees can be selected to respond to more exposed conditions. In any case the ground fixation mechanisms are always manually performed or with simple tools and professional installers are not required.

As previously explained, the system is portable in the sense it is conceived to be displaced in operation as many times as desired within the available sun-exposed area (garden, terrace, balcony, etc) avoiding this way shadows during the day and therefore maximising the performance of the panels. To this end, the structure includes 2 handles, both close to the center of gravity of the assembled system, that are designed to handle the system both from top and bottom and to displace it keeping the verticality of the system and avoiding tensions on the joints.

The solar panel uses semi-flexible technology to favour the lightness and manageability of the system and it is assembled to the structure by means of manually operable screws (no tools required). The panel is divided in 4 detachable subpanels slightly separated and pyramidal in shape to favour the stability of the system. The semi-flexible technology and the division of the panel in 4 subpanels offers 4 outstanding advantages:

Firstly, traditional photovoltaic cells are very fragile and for this reason they are fabricated assembled in panels with a metallic frame in their backs. This frame needs to have large sections to avoid vibrations that may break the cells, and even though the metallic material used is always aluminium (one of the lightest) the resulting weight of the panels is inevitable very high. The use of semi-flexible technology (based on less fragile cells) allows the assembling of the cells with no frame in panels with thicknesses less than half a centimeter. This lightens significantly the weight to be supported by the structure (a key factor in a portable structure) allowing a substantial increase in the size of the panel with respect to the structure.

Secondly, the division of the panel in 4 subpanels and the separation of some centimeters in their joints decrease significantly the resistance to wind allowing this way another increase in the size of the panel with respect to the structure.

Thirdly, the central opening in the horizontal joint of the subpanels (that is furthermore increased by a cutt-off edge in each subpanel) makes room for a retractable handle (close to the center of gravity of the system) that allows the handling of the system from the top for its transport without provoking any movement that may alter the position of the panel or the verticality of the structure.

Fourthly, the division in 4 parts of the panel and its reduced thickness allow their gathering when the system is disassembled, reducing considerably the volume for its transport and storage.

The system as a whole comprising panels, tracking structure and cabling, is furthermore easily assembled and disassembled, allowing its complete installation or uninstalling in just a few minutes. The detachable elements that comprise the system are designed to be packed and folded in a compact small volume that fits in a packing box for its transport and storage The system as a whole has been designed to be compelling and non invasive from an aesthetic point of view so that, as opposed to current structures that often look spatially invasive, it may be compatible with transitable places (gardens, terraces) and may coexist with users.

Furthermore, as opposed to the rest of the structures, that are metallic in most cases, and with the goal of keeping a friendly design, the structure is designed in plastic, a light material with warmer texture that is furthermore cheap and easy to manufacture with the advent of 3D printing.

On the other hand, the movement of the system around the 2 solar orientation axes (elevation and azimuth) is achieved by 2 sets of 2 gears with a high transmission rate driven by low power standard motors. This has 2 important advantages with respect to current tracking systems based in general on linear actuators.

Firstly, the high transmission rate allows the movement of the gears with cheap and very low power motors.

Secondly, the presence of a large gear allows its use as an important structural element with a high torque transmission capacity between substructures. This is what makes possible the use of plastic materials of relatively smaller resistance since otherwise the high structural efforts would only allow the use of metallic materials.

The described design allows several embodiments combining on the one hand the height of the pole, the length of the frame beams and the legs of the tripod, and their respective sections, and on the other the number of cells per subpanel depending on the configuration of the installation.

BRIEF DESCRIPTION OF THE DRAWINGS

In order to complement the current description and to help in understanding the characteristics of the invention with one embodiment example, as an integrating part of it a set of drawings for illustrative and not limited purposes is accompanied where the following is represented.

Figure 1:
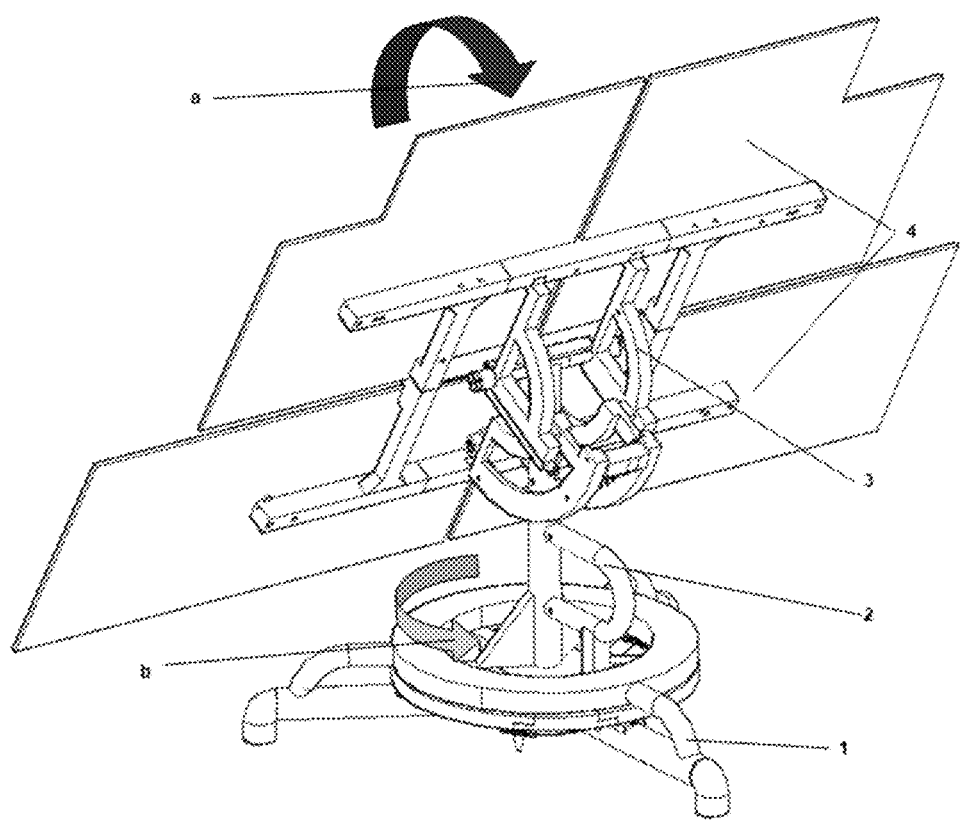
FIG. 1—it shows front and back perspective views of the complete system representing the panels and substructures, and indicating with arrows (a) the vertical rotation in elevation and (b) the horizontal rotation in azimuth FIG. 2—it shows top and bottom views of the bottom structure indicating the elements that comprise it.
Figure 1:
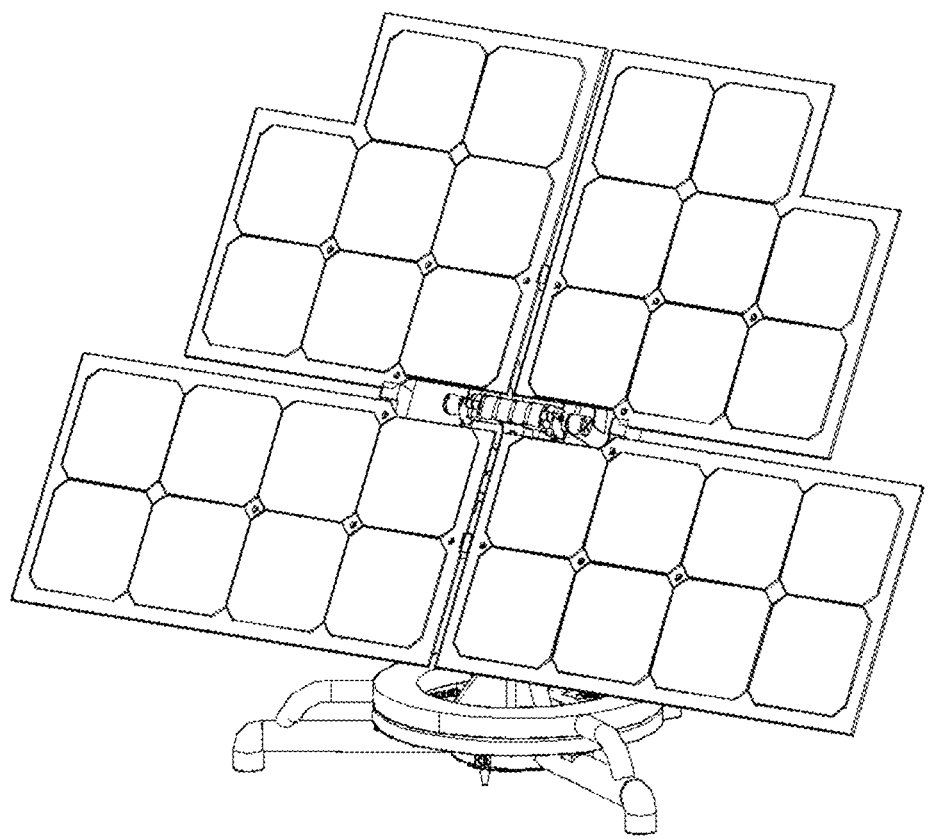

The following list provides the numbering of the different elements represented in the figures to ease their identification:

1. Bottom substructure
1.1 Restraint ring
1.2 Radial legs
1.2' Polar-oriented leg
1.3 Central cylindrical piece
1.4 Azimuth bottom joint axis
1.5 Bracket
1.6 End support (removable) of radial legs
1.7 Azimuth motor
1.8 Azimuth small gear
1.9 Bottom support bearings
1.10 Top support bearings
1.11 Electronic board
1.12 Central hollowing for cabling loop
1.13 Double tilted rod joint
2. Mid substructure
2.1 Pole
2.2 Bottom handle
2.3 Azimuth large gear
2.4 Elevation motor
2.5 Elevation small gear
2.6 Bearing
2.7 Top joint axis hollow
2.8 Lateral buttress
2.9 Bottom circular disk
2.10 Central hollowing for cabling loop
2.11 Bottom joint axis hollow
2.12 External ring of gear
2.13 Internal ring of gear
2.14 Radial tabs for union with pole
3. Top substructure
3.1 Supporting frame
3.2 Lattice of the elevation large gear
3.3 Elevation large gear
3.4 Top handle (folded)
3.4' Top handle (unfolded)
3.5 Screwed hollows
3.6 Tongue and groove joint connecting lattice with frame
3.7 Top joint axis
3.8 Articulated grip of top handle 3.9 Rods of top handle
3.10 Ball joint of rods
3.11 Tubular cavity
3.12 Screwed stop of rod
3.13 Parallel wheels of lattice
3.14 Transverse connection of wheels
4. Panel
4.1 Photovoltaic cells
4.2 Fixation hollows
4.3 Fixation screws
4.4 Cut-off edge of top handle
4.5 Connection boxes of subpanels

PREFERRED EMBODIMENT OF THE INVENTION

In view of the figures mentioned and in accordance with the adopted numbering a preferred embodiment example of the invention can be observed that consists in a panel comprising 4 subpanels of 8 cells with a maximum nominal power of 100 W with its corresponding tracking structure. The mentioned embodiment comprises the parts and elements that are indicated and described in detail hereafter.

The complete tracking structure is fundamentally comprised of three coupled substructures: a base bottom substructure (1) that is permanently in contact with ground; a mid substructure (2) that rotates with respect to the bottom structure (1) in the horizontal plane (solar azimuth) by means of a joint with vertical rotation axis; and a top structure (3), where the panel (4) is assembled, that rotates with respect to the mid structure (2) in the vertical plane (solar elevation) by means of a joint with horizontal rotation axis.

The base bottom substructure (1) is the part of the structure that remains fixed in the solar tracking movement and it is in charge of providing support and stability to the complete system while allowing at the same time the rotation in the azimuth plane of the mid substructure (2). The bottom substructure (1) is shaped in the form of a tripod to provide stability to the structure by means of the end supports (1.6) of the radial legs (1.2).

Figure 2:
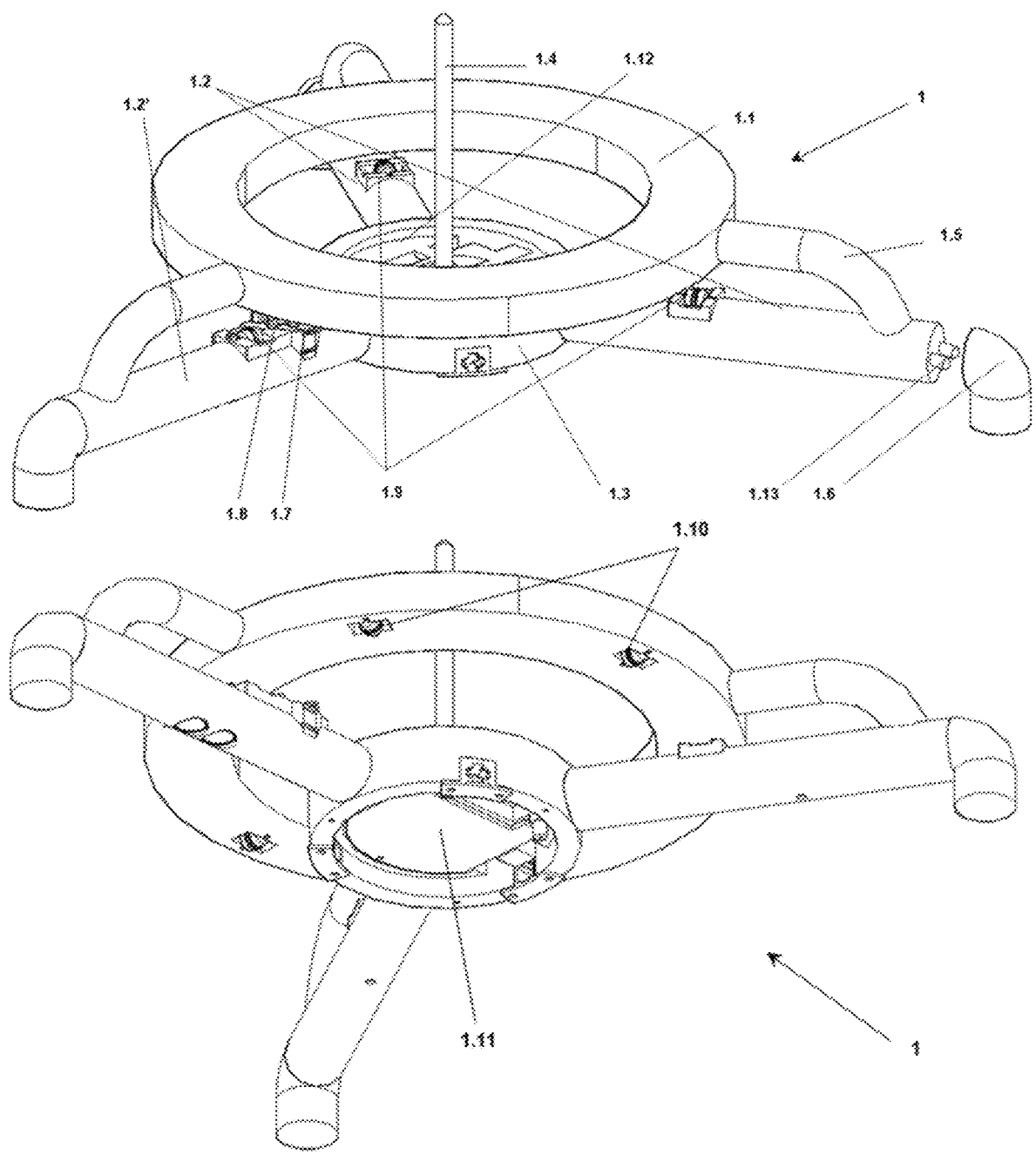

The bottom substructure (1) represented in detail in FIG. 2 is comprised therefore by 3 tripod-shaped radial legs (1.2) that are joined in a central cylindrical piece (1.3). The design of each leg (1.2) includes a space for a bottom support bearing (1.9), that supports the azimuth large gear (2.3) of the mid substructure (2), and is completed by a bracket (1.5) rigidly connected to the restraint ring (1.1). The restraint ring (1.1) is intended to provide upper support to the azimuth large gear (2.3) of the mid substructure (2) by means of top support bearings (1.10).

The bottom side of the central cylindrical piece (1.3) represented in detail in FIG. 2 presents a central hollowing for the electronic board (1.11) in charge of the control of the motors with an enough depth for being covered by a protective cover.

The upper side of the central cylindrical piece (1.3) presents a hollowing (1.12) to provide room for a cabling loop (coming from the mid substructure (2)) large enough to allow the complete rotation of the structure with no tension or hookings.

Figure 7:
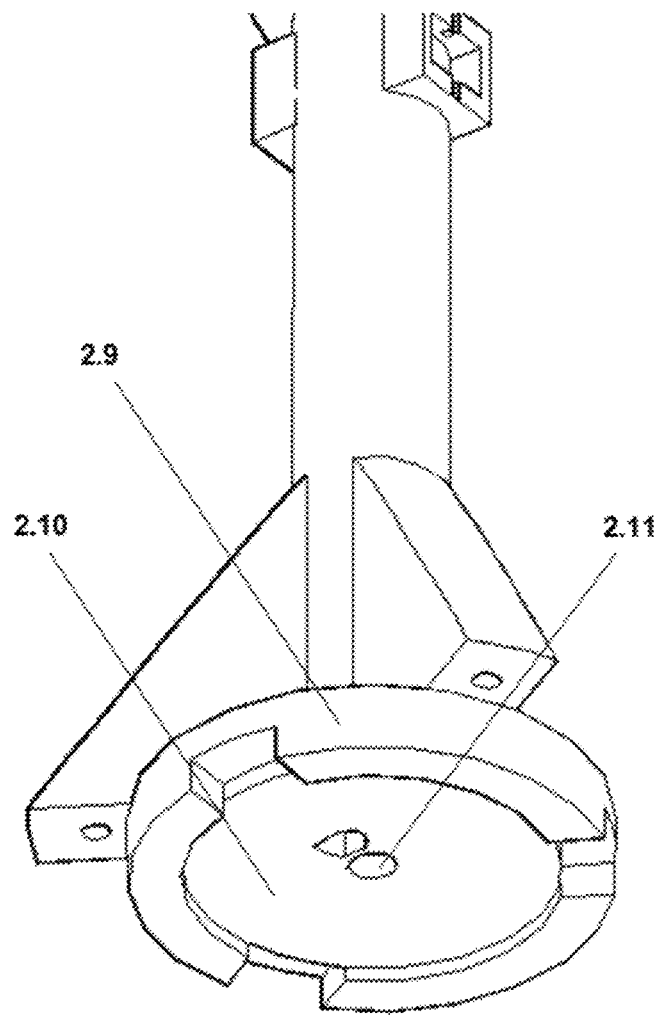
FIG. 7—it shows in detail the base of the pole indicating the position of the base circular disc and its design characteristics.

In the center of the upper side of the central cylindrical piece (1.3) a pillar is placed that acts as an azimuth bottom joint axis (1.4) between the bottom substructure (1) and the mid substructure (2), and that fits inside the bottom joint axis hollow (2.11) of the pole (2.1) represented in FIG. 7.

Figure 6:
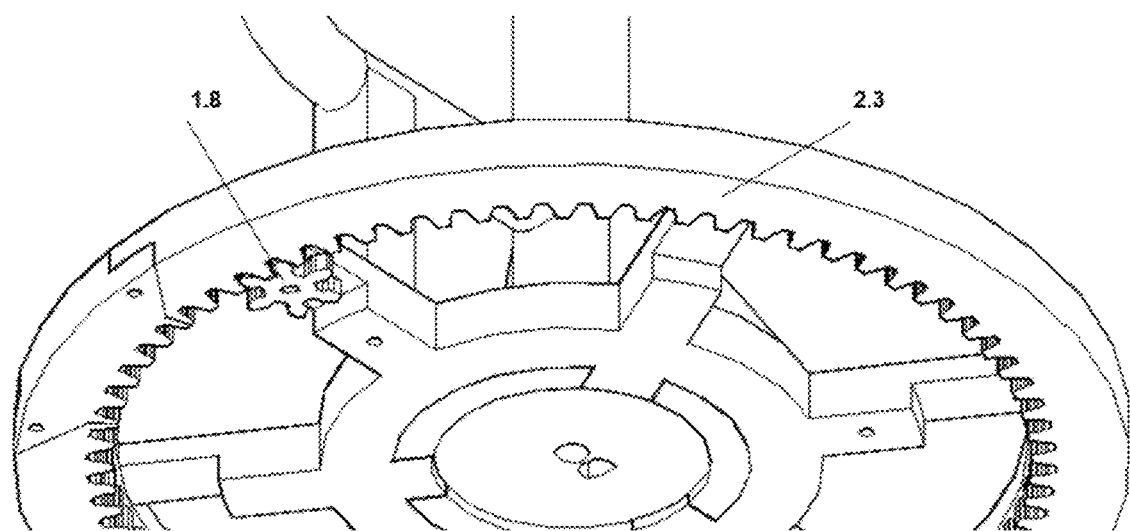
FIG. 6—it shows a view of the gears of the azimuth.

One of the radial legs (1.2) is oriented towards the Earth's pole (1.2') and includes a space for the insertion of the azimuth motor (1.7), in whose shaft fits the azimuth small gear (1.8) that as can be seen in FIG. 6 is coupled with the azimuth large gear (2.3) of the mid substructure (2).

As illustrated in FIG. 2, the end supports (1.6) of the radial legs (1.2) are removable. The assembling is manual and the joint with the radial leg (1.2) is designed so that it fits by means of a double tilted rod (1.13) that transforms the existing shear stress in the joint into a compressive stress between the 2 faces of the joint stabilizing the end support (1.6). The end supports (1.6), that are manually removable, allow the attachment of supports with different designs and with different ground fixation degrees to respond to different environment conditions. In any case the ground fixation mechanisms are always manually performed or with simple tools.

The mid substructure (2) is the part of the system that rotates in the azimuth plane supporting the top substructure (3) and resting horizontally on the bottom structure (1). The coupling with the top substructure (3) is made by means of a joint with a horizontal rotational axis and with the bottom substructure (1) by means of a joint with a vertical rotational axis.

Figure 3:
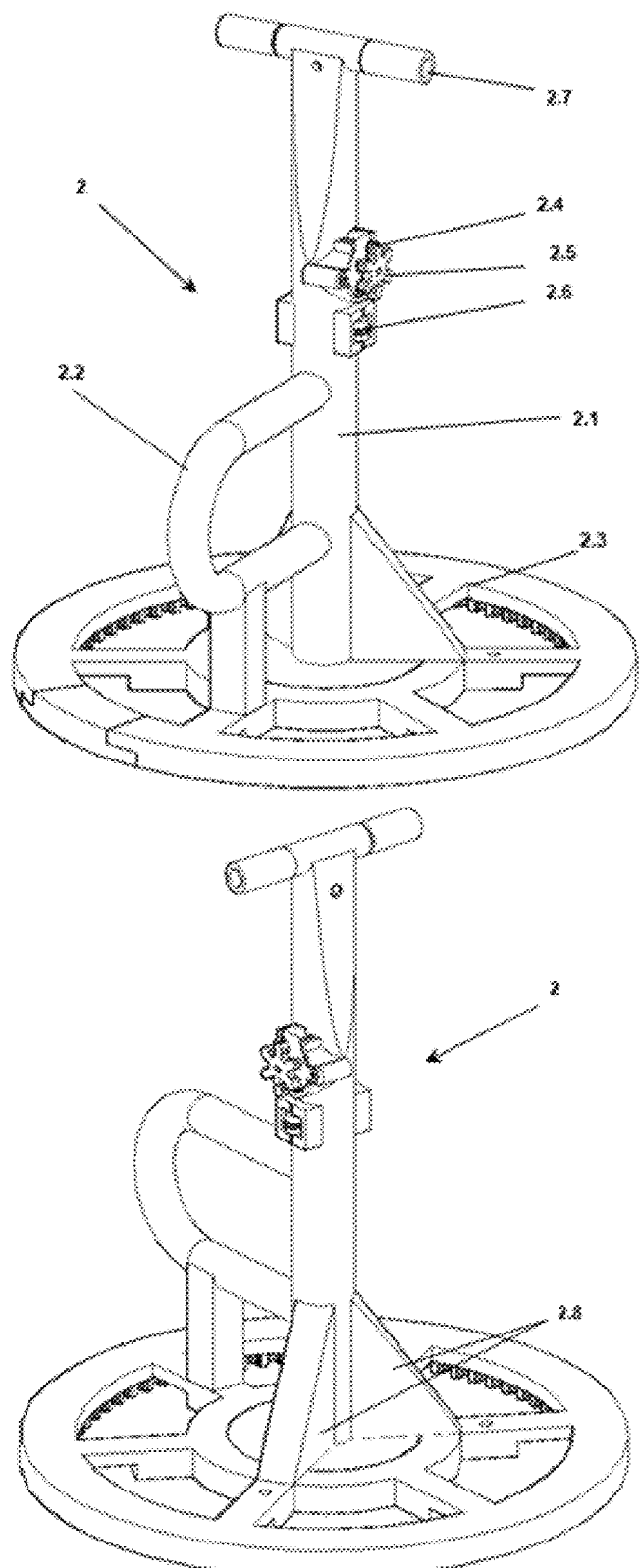
FIG. 3—it shows back and front views of the mid substructure indicating the elements that comprise it.
Figure 4:
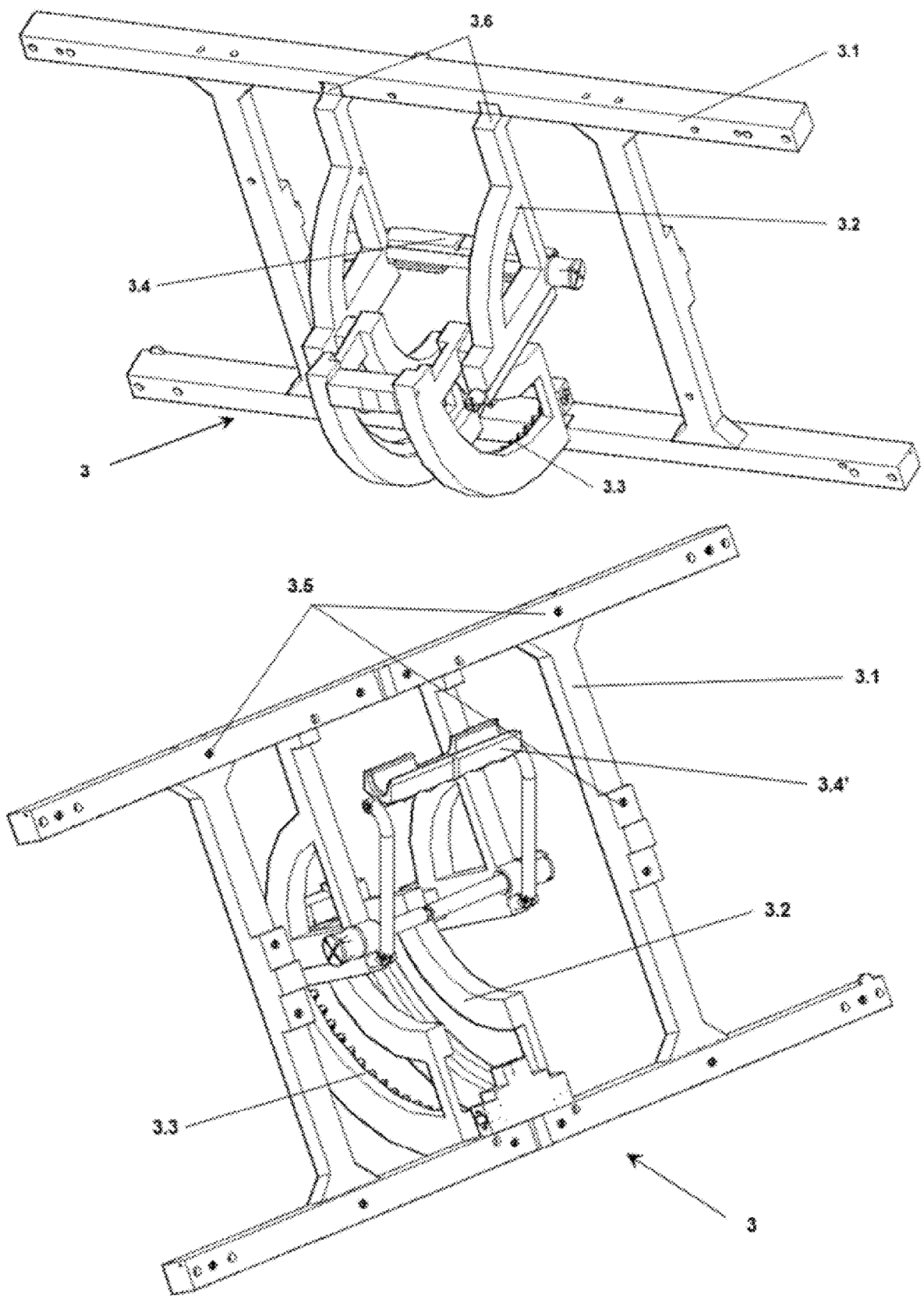
FIG. 4—it shows back and front views of the top substructure indicating the elements that comprise it.
Figure 5:
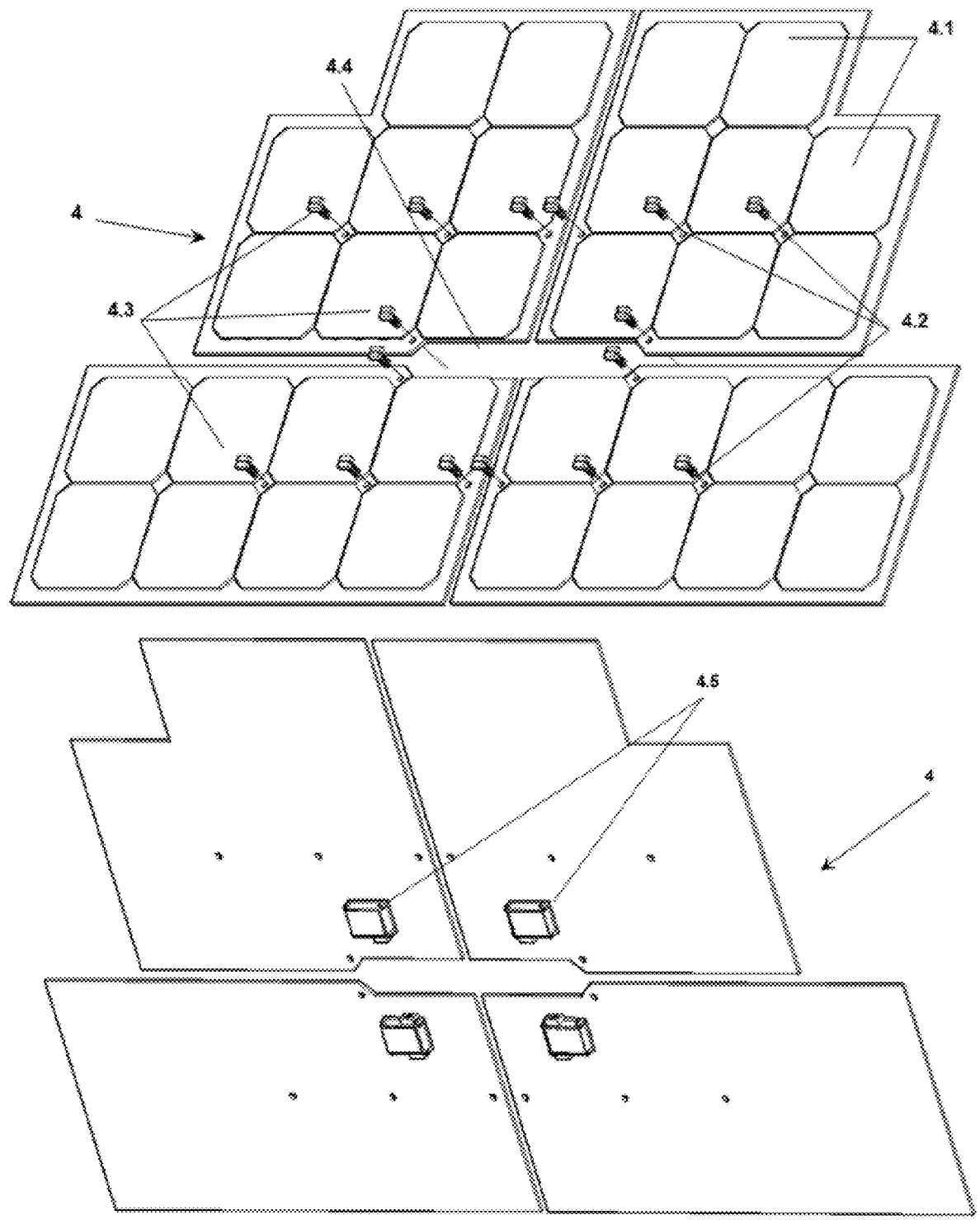
FIG. 5—it shows front and back views of the panel indicating the elements that comprise it.

The mid substructure (2), represented in FIG. 3, consists of 3 main elements: the pole (2.1), the bottom handle (2.2) and the azimuth large gear (2.3).

As illustrated in FIG. 6 the azimuth large gear (2.3) is coupled with the azimuth small gear (1.8) that in turn is rigidly connected with the shaft of the azimuth motor (1.7) inserted in the polar-oriented leg (1.2') of the bottom substructure (1). The two azimuth gears (1.8, 2.3) make up a toothed gear system with a transmission rate of 12 (72 teeth the azimuth large gear (2.3) and 6 teeth the azimuth small gear (1.8)). The azimuth motor (1.7) acts on the azimuth small gear (1.8) and takes advantage of the high transmission rate to have control over the azimuth large gear (2.3) that requires a soft and accurate movement.

Figure 8:
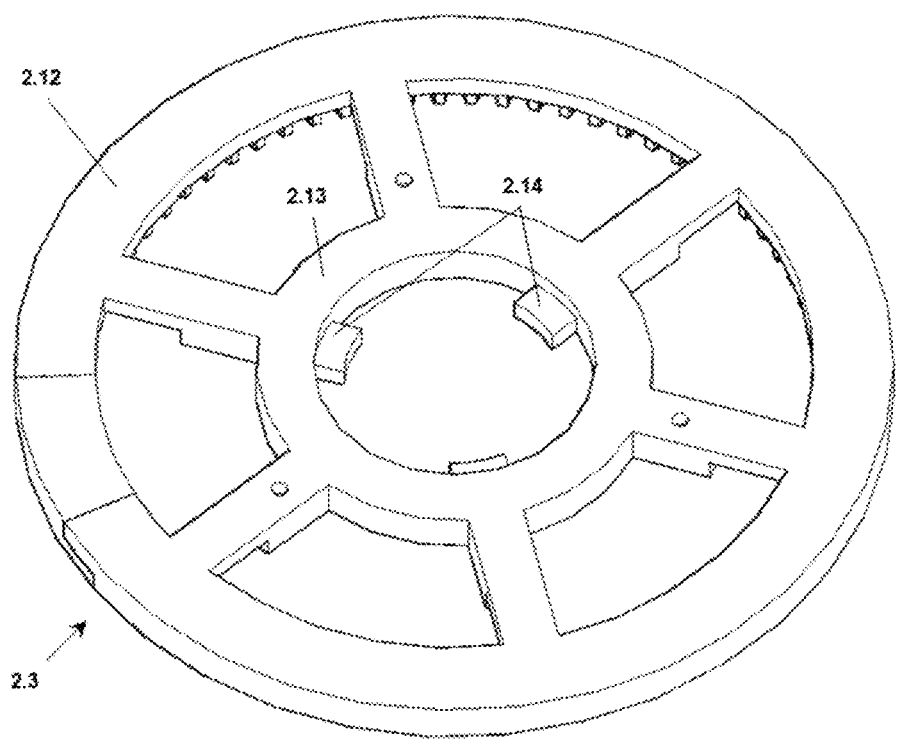
FIG. 8—it shows in detail the azimuth large gear indicating the internal and external rings and the radial tabs of the internal ring for the support of the circular disc of the pole base.

The azimuth large gear (2.3), represented in detail in FIG. 8, consists of an external ring (2.12) and an internal ring (2.13) joined together by 6 spokes. The teeth of the azimuth large gear (2.3) are placed in the bottom side of the external ring (2.12) oriented inwards in order to protect the azimuth motor (1.7) that this way remains hidden. The external ring (2.12) provides furthermore support for the top support bearings (1.10) of the restraint ring (1.1) and for the bottom support bearings (1.9) of the radial legs (1.2) of the bottom substructure (1).

The internal ring (2.13) keeps the same section as the external ring (2.12) and its internal space is occupied by a bottom circular disk (2.9) of the base of the pole (2.1) as can be seen in detail in FIG. 7. The joint of the pole (2.1) with the azimuth large gear (2.3) is made by means of 3 radial tabs (2.14) oriented towards the inside of the internal ring (2.13), as represented in FIG. 8, that fit in the base of the bottom circular disk (2.9) of the pole (2.1) and that are adjusted by screws.

The pole (2.1) is the vertical column that rests in its base on the internal ring (2.13) of the azimuth large gear (2.3) and that contains in its bottom base the bottom joint axis hollow (2.11) for the azimuth bottom joint axis (1.4) of the bottom substructure (1), and in its top the top joint axis hollow (2.7) of the top substructure (3). The design includes in its center the space for the elevation motor (2.4) and the spaces for the bearings (2.6). The elevation small gear (2.5) fits in the shaft of the elevation motor (2.4) and is in charge of the orientation of the elevation large gear (3.3) that leans on the mentioned bearings (2.6).

The support of the pole (2.1) on the azimuth large gear (2.3) is strengthened with 2 lateral buttresses (2.8) that are joined to the internal ring (2.13) of the azimuth large gear (2.3) by means of tongue and groove joints and screws and that absorbs the buckling of the pole in the lateral directions of the panel.

The bottom circular disk (2.9) of the pole (2.1), which is represented in detail in FIG. 7, leans on the 3 radial tabs (2.14) of the interior ring (2.13) of the azimuth large gear (2.3) and is crossed through its center by the azimuth bottom joint axis (1.4) of the bottom substructure (1). The bottom side of the bottom circular disk (2.9) of the pole (2.1) presents a central hollowing (2.10) equivalent to the hollowing (1.12) of the top side of the central cylindrical piece (1.3) of the bottom substructure (1) that as said before provides room for a cabling loop large enough to allow the complete rotation of the structure with no tension or hookings.

The bottom handle (2.2) provides portability from below to the system when it is placed in a level above the floor, or more generally when the position of the center of the panel is above the user's hands, and it has been designed so that the grip is the closest possible to the center of gravity of the complete system and it curves up over itself 180 degrees to increase the gripping angles. Both the resulting two sides of the curved bottom handle (2.2) are rigidly connected to the pole (2.1) around its center and another support is projected from the lower end of the curved part towards one spoke of the azimuth large gear (2.3). This design of 3 support points of the bottom handle (2.2) accomplishes a very important structural function because it absorbs most of the bending tension of the pole (2.1) in the direction of greatest stress that is the one perpendicular to the panel (4). In order to strengthen this function the 3 support points are joined by means of tongue and groove joints and screws.

The top substructure (3) is connected to the mid substructure (2) by means of a joint with horizontal rotation axis that allows the rotation in the elevation plane of the top substructure (3) with respect to the mid structure (2) with which it rotates rigidly in the azimuth plane. The complete structure provides therefore 2 degrees of freedom to the panel in both the azimuth and elevation planes since the panel (4) is rigidly assembled to the top substructure (3) through a supporting frame (3.1).

The top substructure (3) consists of 3 elements: the supporting frame (3.1) of the panel (4), the lattice (3.2) of the elevation large gear (3.3) and the top handle (3.4).

The supporting frame (3.1) of the panel (4) is used to assemble rigidly the solar panels (4) to the structure. The fixing mechanism consists in screws (4.3) that have been designed to be operated manually (with no tools) and that fits in screwed hollows (3.5) placed along the frontal side of the transversal and lateral beams of the supporting frame (3.1) through hollows (4.2) made in the panels (4). The transversal beams present an extension in their ends to provide the maximum support to the subpanels and contain in their back central part the spaces for the joint with the lattice (3.2) of the elevation large gear (3.3) by means of tongue and groove joints (3.6).

Figure 9:
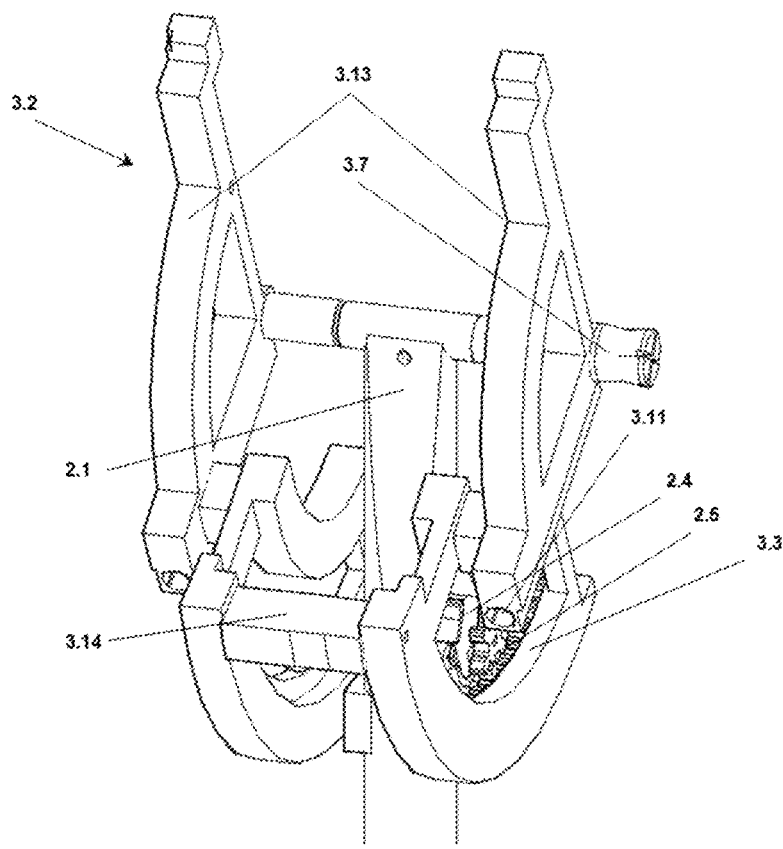
FIG. 9—it shows in detail the fit of the lattice of the elevation gear with the pole indicating the position of the gears and the design characteristics of the lattice.

The lattice (3.2) of the elevation large gear (3.3), represented in detail in FIG. 9, comprises two parallel wheels (3.13) of two external rings each, one internal and extending 180 degrees and the other external and covering 100 degrees, that are joined by a transverse connection (3.14) in the center of the external rings. The ends of the external rings are rigidly connected to the supporting frame (3.1) by means of tongue and groove joints (3.6) and the center of the wheels presents a stretch of hollow cylinders that are connected to the one at the top end of the pole (2.1) by means of the horizontal axis (3.7) of the elevation joint (2.7) allowing this way the rotation of the lattice (3.2) around it. Finally, the internal part of the external rings of the wheels (3.13) leans on the bearings (2.6) of the pole (2.1) in its elevation rotation, transmitting this way the torques from the top substructure (3) to the mid substructure (2).

As can be seen in FIG. 9 the elevation large gear (3.3) is contained in the lower part of the external ring of the right wheel and is coupled to the elevation small gear (2.5) that in turn is rigidly connected to the shaft of the elevation motor (2.4) contained in the pole (2.1) of the mid substructure (2). These 2 elements make up a toothed gear system that, as in the azimuth system, have a transmission rate of 12 but just keeping 20 of the 72 tooth of the large gear. These 20 teeth cover therefore 100 degrees of circle that are enough to sweep the maximum range of solar elevation (0 to 90 degrees). The design of both elevation gears (3.3, 2.5) and the control of the elevation motor (2.4) involved in its movement are equivalent to the ones corresponding to the azimuth already described.

Figure 10:
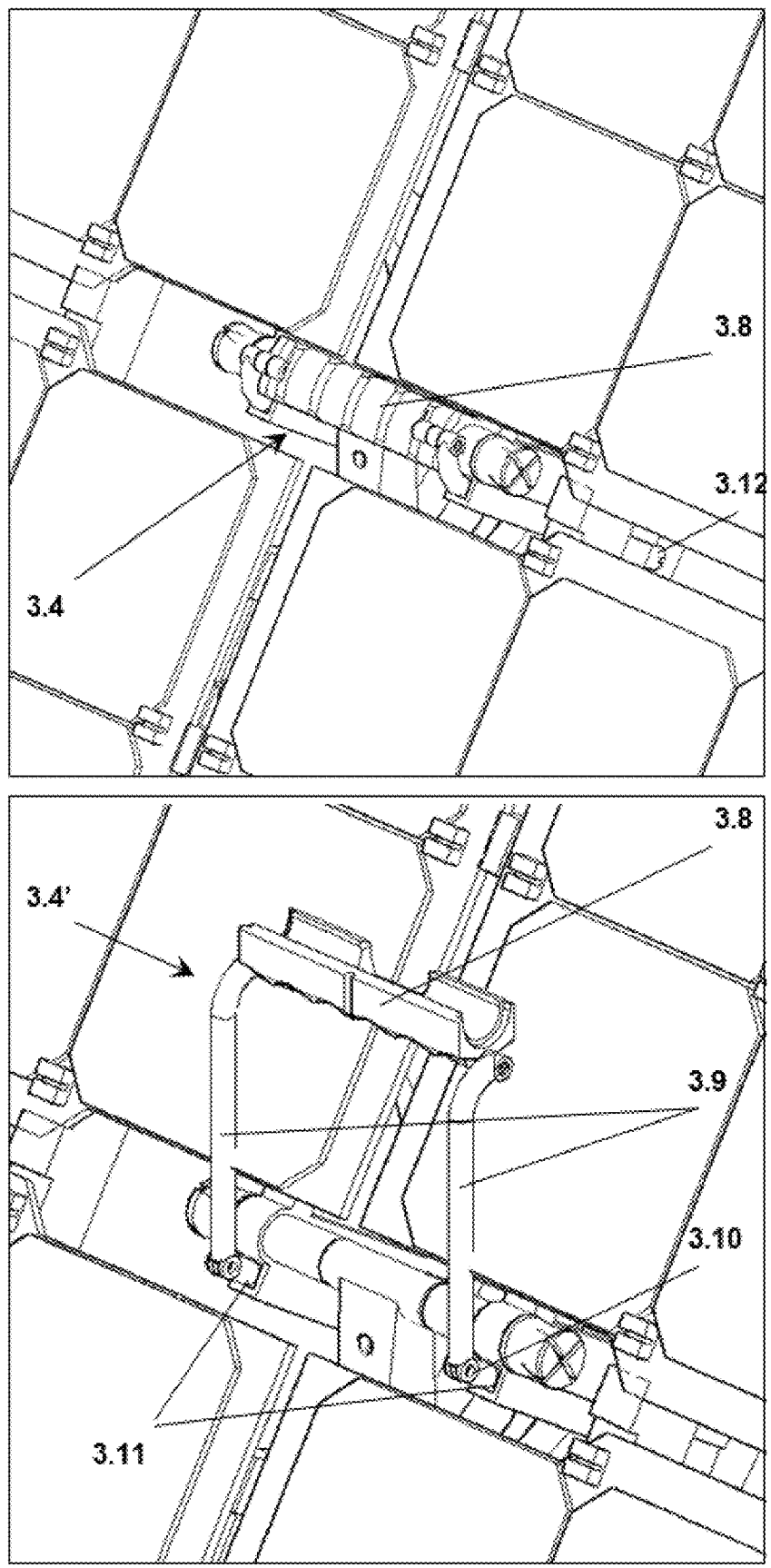
FIG. 10—it shows in detail the top retractable handle in both folded and unfolded positions indicating its design characteristics.

The top handle (3.4) represented in detail in FIG. 10, provides portability from above to the system when it is placed on the floor, or more generally when the position of the center of the panel is below the user's hands. This top handle (3.4), comprising an articulated grip (3.8) and two parallel rods (3.9), has been designed as a retractable handle in such a way that their rods (3.9) can be unfolded towards the frontal side of the panels (4) making this way the handle operative (3.4') when the systems needs to be displaced, and can be folded back inside the tubular cavities (3.11) releasing this way the frontal side of the panels (4) exposed to solar radiation once the panel (4) is placed in the desired position. The size of each tubular cavities (3.11) is adjusted to the size of the rods (3.9) in such a way that the rods can slide until a screwed top (3.12) placed in their ends. A ball joint (3.10) in the bottom end of the emerging part of the rods (3.9) allows the rotation of the top handle (3.4) until its vertical position. The position of the tubular cavities (3.11) and the ball joints (3.10) has been designed keeping them close to the center of gravity to allow its transport keeping its verticality and avoiding tensions in the joints.

The solar panel (4) uses semi-flexible technology to favour the lightness and manageability of the system and it is assembled to the structure by means of screws (4.3) through the frame (3.1) of the top substructure (3). The design of the panel (4) is pyramidal to favour the stability of the system as a whole, and it is divided in 4 detachable subpanels. The top subpanels present their cells (4.1) ordered in a symmetric distribution in 2 bottom rows of 3 cells and 1 top row of 2. The bottom subpanels present a layout of only 2 rows of 4 cells.

The design used for the cells (4.1) of the panels (4) is a standard type based on squares of 12.5 cm per side with cut-off corners that allow the opening of hollows between internal cells of the panels for the fixation screws (4.3) with the frame (3.1).

The end of each panel in the central junction of the 4 subpanels has a cut-off edge (4.4) that opens a space for the grip of the retractable handle (3.4).

The connexion boxes (4.5) of each subpanel has been designed in a position close to the corner in the central joint of the 4 subpanels and with a reduced size so that they remain inside of the area limited by the transverse and lateral beams of the frame (3.1) of the top substructure (3). This way the interconnection cables of the subpanels, that are removable and connected in parallel, are reduced.

Figure 11:
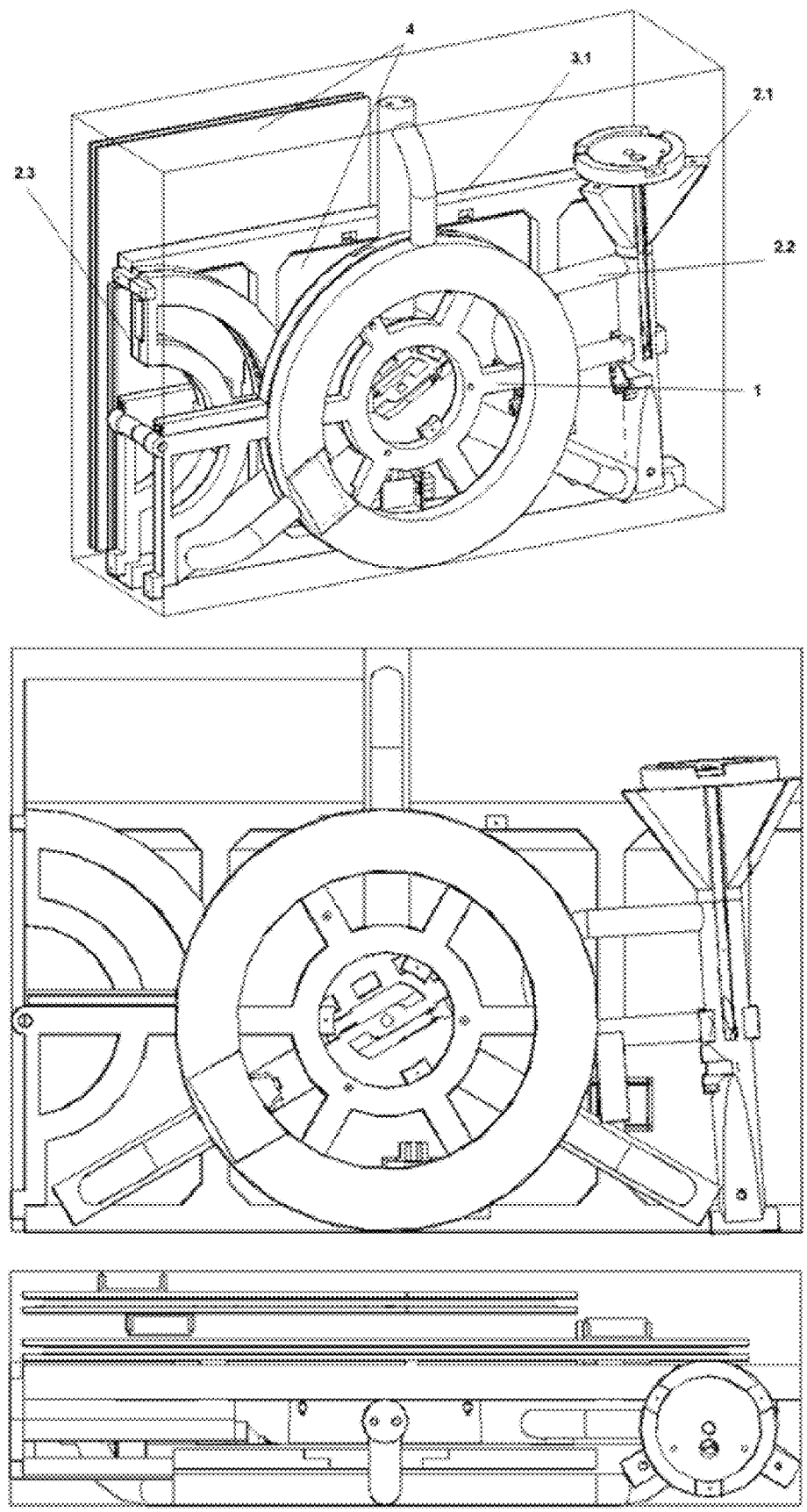
FIG. 11—it shows a perspective view of the system folded in a compact volume together with frontal and top views, indicating the position of the layers and the comprising pieces.

The detachable elements and cabling tracts resulting from the dissemblance of the complete system are designed to be packed and folded in a compact set of minimum volume to fit in a packing box for its transport and storage. FIG. 11 represents this compact volume that comprises 4 layers with the following elements:

- the first layer contains the upper subpanels (4) joined by their frontal sides,
- the second contains the lower subpanels (4) joined also by their frontal sides,
- the third contains the entire fixation frame (3.1),
- and the forth contains in the center the bottom substructure (1) together with the large gear of the azimuth (2.3), on one side the lattice (3.2) of the elevation gear in folded shape and on the other the pole (2.1) with the top handle (2.2) folded.

The invention claimed is:

1. A portable system of a photovoltaic panel with 2-axes solar tracking system comprising:
    a base bottom substructure that includes a plurality of radial legs, with end supports fixed and joined with the radial legs during the solar tracking process, a central cylindrical piece where the radial legs are joined and that contains in its center an azimuth bottom joint axis comprising an azimuth joint, and a top restraint ring that is joined by brackets to the radial legs;
    a mid substructure that is joined with the bottom substructure by the azimuth joint, that comprises a pole, a bottom handle and a set of azimuth gears comprising an azimuth large gear and an azimuth small gear;
    a top substructure that is joined with the mid substructure by an elevation horizontal axis joint, that comprises a supporting frame for the photovoltaic panel, a top retractable handle unfoldable towards the frontal side of the photovoltaic panel, and a lattice that integrates a set of elevation gears comprising an elevation large gear and an elevation small gear;
    and wherein the photovoltaic panel comprises four semi-flexible subpanels pyramidal in shape and with fixation hollows for assembling said subpanels to the top substructure through the supporting frame by fixation screws, each subpanel comprising a central joint.

2. The portable system of a photovoltaic panel with 2-axes solar tracking system in accordance with claim 1, wherein one radial leg that presents polar orientation and the pole include spaces for the insertion of motors comprising shafts where the azimuth small gear and the elevation small gear respectively fits.

3. The portable system of a photovoltaic panel with 2-axes solar tracking system in accordance with claim 1, wherein the top restraint ring and the radial legs include space for top support bearings and bottom support bearings respectively to support the azimuth large gear.

4. The portable system of a photovoltaic panel with 2-axes solar tracking system in accordance with claim 1, wherein the azimuth large gear comprises an external ring and an internal ring that contains three radial tabs projected towards the inside of the internal ring.

5. The portable system of a photovoltaic panel with 2-axes solar tracking system in accordance with claim 1, wherein the pole includes two lateral hollows for bearings that support the lattice of the elevation large gear.

6. The portable system of a photovoltaic panel with 2-axes solar tracking system in accordance with claim 1, wherein the pole comprises a bottom base and a top end, the bottom base containing a vertical cylindrical hollow for the azimuth bottom joint axis of the bottom substructure, and top end, a horizontal cylindrical hollow for the elevation top joint axis of the top substructure.

7. The portable system of a photovoltaic panel with 2-axes solar tracking system in accordance with claim 4, wherein the pole includes in its pole base two lateral buttresses joined by tongue and groove joints to the internal ring of the azimuth large gear, and a bottom circular disc that leans on the three radial tabs of the azimuth large gear.

8. The portable system of a photovoltaic panel with 2-axes solar tracking system in accordance with claim 7, wherein the upper side of the central cylindrical piece and the bottom side of the bottom circular disk of the pole includes a hollowing size thereby providing room for a cabling loop large enough to allow the complete rotation of the mid substructure around the bottom substructure.

9. The portable system of a photovoltaic panel with 2-axes solar tracking system in accordance with claim 1, wherein the bottom handle consists in a grip that curves up over itself 180 degrees and that projects two rigid supports towards the pole and a third support towards one spoke of the azimuth large gear.

10. The portable system of a photovoltaic panel with 2-axes solar tracking system in accordance with claim 1, wherein the supporting frame of the panel comprises two lateral and two transversal beams with an extension in ends of the beams to provide support to the panel and that contain screwed hollows placed along a frontal side of the beams for the fitting of screws for the fixation of the panel.

11. The portable system of a photovoltaic panel with 2-axes solar tracking system in accordance with claim 1, wherein the lattice of the elevation large gear comprises two parallel wheels of two external rings each, one internal and extending 180 degrees and the other external and covering 100 degrees, that are joined by a transverse connection in the center of the external rings.

12. The portable system of a photovoltaic panel with 2-axes solar tracking system in accordance with claim 1, wherein the top retractable handle consists of an articulated grip and two parallel rods each with a ball joint in the bottom end of the emerging part and a screwed top in their ends.

13. The portable system of a photovoltaic panel with 2-axes solar tracking system in accordance with claim 1, further comprising a cut-off edge in each of said central joints thereby opening a space for unfolding the top retractable handle.

14. The portable system of a photovoltaic panel with 2-axes solar tracking system in accordance with claim 1, wherein the plurality of radial legs further comprises three radial legs that form a tripod.

\* \* \* \* \*